(12) United States Patent
Bielefeld (10) Patent No.: US 10,794,474 B1
(45) Date of Patent: Oct. 6, 2020

(54) SYSTEM AND METHOD FOR CONTROLLING A TRANSMISSION ON A MARINE ENGINE

(71) Applicant: Brunswick Corporation, Mettawa, IL (US)

(72) Inventor: Brett Bielefeld, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 99 days.

(21) Appl. No.: 16/171,056

(22) Filed: Oct. 25, 2018

(51) Int. Cl.
| | |
|---|---|
| F16H 61/02 | (2006.01) |
| F16H 59/18 | (2006.01) |
| F16H 59/40 | (2006.01) |
| B63H 20/14 | (2006.01) |
| F16H 59/36 | (2006.01) |
| F16H 59/44 | (2006.01) |
| F16H 59/70 | (2006.01) |

(52) U.S. Cl.
CPC ......... *F16H 61/0213* (2013.01); *B63H 20/14* (2013.01); *F16H 59/18* (2013.01); *F16H 59/40* (2013.01); *F16H 59/44* (2013.01); *F16H 59/70* (2013.01); *F16H 2059/366* (2013.01)

(58) Field of Classification Search
CPC ...... F16H 61/0213; F16H 95/18; F16H 95/40; F16H 59/18; F16H 59/40; F16H 59/44; F16H 59/70; F16H 2059/366; B63H 20/14
See application file for complete search history.

(56) References Cited

U.S. PATENT DOCUMENTS

| | | | |
|---|---|---|---|
| 3,823,801 A | 7/1974 | Arnold | |
| 3,994,254 A | 11/1976 | Woodfill | |
| 4,027,758 A | 6/1977 | Gustavsson et al. | |
| 4,173,939 A | 11/1979 | Strang | |
| 4,323,354 A | 4/1982 | Blanchard | |
| 5,711,742 A | 1/1998 | Leinonen et al. | |
| 6,174,264 B1 * | 1/2001 | Hoshiba | B63H 21/22 477/102 |
| 6,176,750 B1 | 1/2001 | Alexander et al. | |
| 6,478,715 B1 | 11/2002 | Hunold | |

(Continued)

FOREIGN PATENT DOCUMENTS

| | | |
|---|---|---|
| DE | 2544338 | 4/1977 |
| GB | 1530959 | 11/1978 |
| WO | WO 2002085703 | 10/2002 |

OTHER PUBLICATIONS

Poirier et al., "Acceleration Control Method for Marine Engine," U.S. Appl. No. 62/718,575, filed Aug. 14, 2018.

*Primary Examiner* — Tinh Dang
(74) *Attorney, Agent, or Firm* — Andrus Intellectual Property Law, LLP (57) ABSTRACT

A method for controlling a transmission of a marine propulsion device powered by an engine is carried out by a control module and includes monitoring a requested gear state of the transmission and a requested throttle position of a throttle valve on the engine. In response to the requested gear state being a neutral state or in response to the requested throttle position decreasing by more than a predetermined amount within a predetermined period of time, the control module controlling at least one of a pressure in a forward clutch of the transmission and a pressure in a reverse clutch of the transmission in a manner that is contraindicated by the requested gear state.

20 Claims, 7 Drawing Sheets

(56) References Cited

U.S. PATENT DOCUMENTS

| | | |
|---|---|---|
| 6,487,923 B1 | 12/2002 | Hunold |
| 6,554,663 B2 | 4/2003 | Neisen |
| 7,082,932 B1 | 8/2006 | Crane |
| 7,722,500 B2 | 5/2010 | Sato et al. |
| 7,891,263 B2 | 2/2011 | Mowbray et al. |
| 8,016,626 B2 | 9/2011 | Suzuki et al. |
| 8,255,133 B2 * | 8/2012 | Ahn ................ F16H 63/42 340/441 |
| 8,439,800 B1 | 5/2013 | Bazan et al. |
| 8,641,462 B2 | 2/2014 | Kuriyagawa |
| 8,690,621 B2 | 4/2014 | Kuriyagawa et al. |
| 8,740,659 B2 | 6/2014 | Kuriyagawa et al. |
| 8,751,075 B2 | 6/2014 | Leehaug et al. |
| 8,764,500 B2 | 7/2014 | Kuriyagawa et al. |
| 9,039,468 B1 | 5/2015 | Arbuckle et al. |
| 9,133,910 B1 | 9/2015 | VanSelous et al. |
| 9,248,898 B1 | 2/2016 | Kirchhoff et al. |
| 9,376,196 B2 | 6/2016 | Kuriyagawa et al. |
| 9,441,724 B1 | 9/2016 | Pugh |
| 9,446,829 B1 | 9/2016 | Williams et al. |
| 9,878,768 B1 | 1/2018 | VanSelous et al. |
| 9,896,178 B1 | 2/2018 | Przybyl et al. |
| 2002/0187877 A1 | 12/2002 | Skupinski et al. |
| 2004/0064224 A1 | 4/2004 | Hasler et al. |
| 2014/0229083 A1 | 8/2014 | Leehaug et al. |

* cited by examiner

SYSTEM AND METHOD FOR CONTROLLING A TRANSMISSION ON A MARINE ENGINE

FIELD

The present disclosure relates to systems and methods for controlling transmissions associated with internal combustion engines that power marine propulsion devices on a marine vessel.

BACKGROUND

U.S. Pat. No. 8,016,626 discloses a marine propulsion system that achieves both an acceleration performance and top speed closer to the performance desired by a boat driver including an engine, propellers rotated by the driving force of the engine, a transmission mechanism arranged to convey the driving force of the engine to the propellers at least after shifting into a low speed reduction gear ratio and into a high speed reduction gear ratio, an acceleration sensor arranged to detect the acceleration of a hull propelled by the rotation of the propellers, and a control section and an ECU arranged to carry out the control for changing the reduction gear ratio of the transmission mechanism. The control section and the ECU are configured to control the transmission mechanism to shift from the low speed reduction gear ratio into the high speed reduction gear ratio based on the acceleration of the hull.

U.S. Pat. No. 8,439,800 discloses a shift control system for a marine drive that applies partial clutch engagement pressure upon initial shifting from forward to reverse to prevent stalling of the engine otherwise caused by applying full clutch engagement pressure upon shifting from forward to reverse.

U.S. Pat. No. 9,446,829 discloses a transmission for an outboard marine engine. The transmission comprises a rotatable input shaft that is rotated by an internal combustion engine, a rotatable output shaft that powers a propulsor, a forward gear that causes forward rotation of the output shaft and propulsor, a reverse gear that causes reverse rotation of the output shaft and propulsor, a clutch that is movable between a forward clutch position wherein the forward gear causes the forward rotation of the output shaft and propulsor and a reverse clutch position wherein the reverse gear causes the reverse rotation of the output shaft and propulsor, and an internal ring gear that couples the output shaft to one of the forward gear and the reverse gear.

U.S. Pat. No. 9,878,768 discloses a marine transmission including a synchronizer on a counter rotating shaft to shift into a high speed gear. The synchronizer includes friction surfaces on both sides of the gear body for the high speed gear. The high speed gear mesh is helical and generates axial force that enhances the torque carrying capacity of synchronizing friction surfaces, thereby enabling the shifting into the high speed gear without torque interrupt.

U.S. Provisional Application No. 62/718,575, filed Aug. 14, 2018, discloses a wet clutch and optionally a trolling valve in a marine engine, which are utilized to allow the engine to spool up to a desired engine speed before the transmission fully engages forward gear. Such a methodology can be used to enhance launch of a marine vessel powered by the marine engine.

The above-noted patents and applications are hereby incorporated by reference herein, in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A method according to one example of the present disclosure is for controlling a transmission of a marine propulsion device powered by an engine. The method is carried out by a control module and comprises monitoring a requested gear state of the transmission and a requested throttle position of a throttle valve on the engine. In response to the requested gear state being a neutral state or in response to the requested throttle position decreasing by more than a predetermined amount within a predetermined period of time, the method includes controlling at least one of a pressure in a forward clutch of the transmission and a pressure in a reverse clutch of the transmission in a manner that is contraindicated by the requested gear state.

According to another example of the present disclosure, a marine propulsion system for a marine vessel includes an engine having an output shaft, a propeller having an input shaft, and a transmission configured to couple the engine's output shaft to the propeller's input shaft in a torque-transmitting relationship. The transmission includes a forward gear and an associated forward clutch and a reverse gear and an associated reverse clutch. A control lever is positionable to request engagement of one of the forward gear and the reverse gear of the transmission. A control module controls a pressure in the forward clutch and a pressure in the reverse clutch. The control module controls the reverse clutch pressure to a positive reverse clutch pressure value in a manner that is contraindicated by a position of the control lever.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
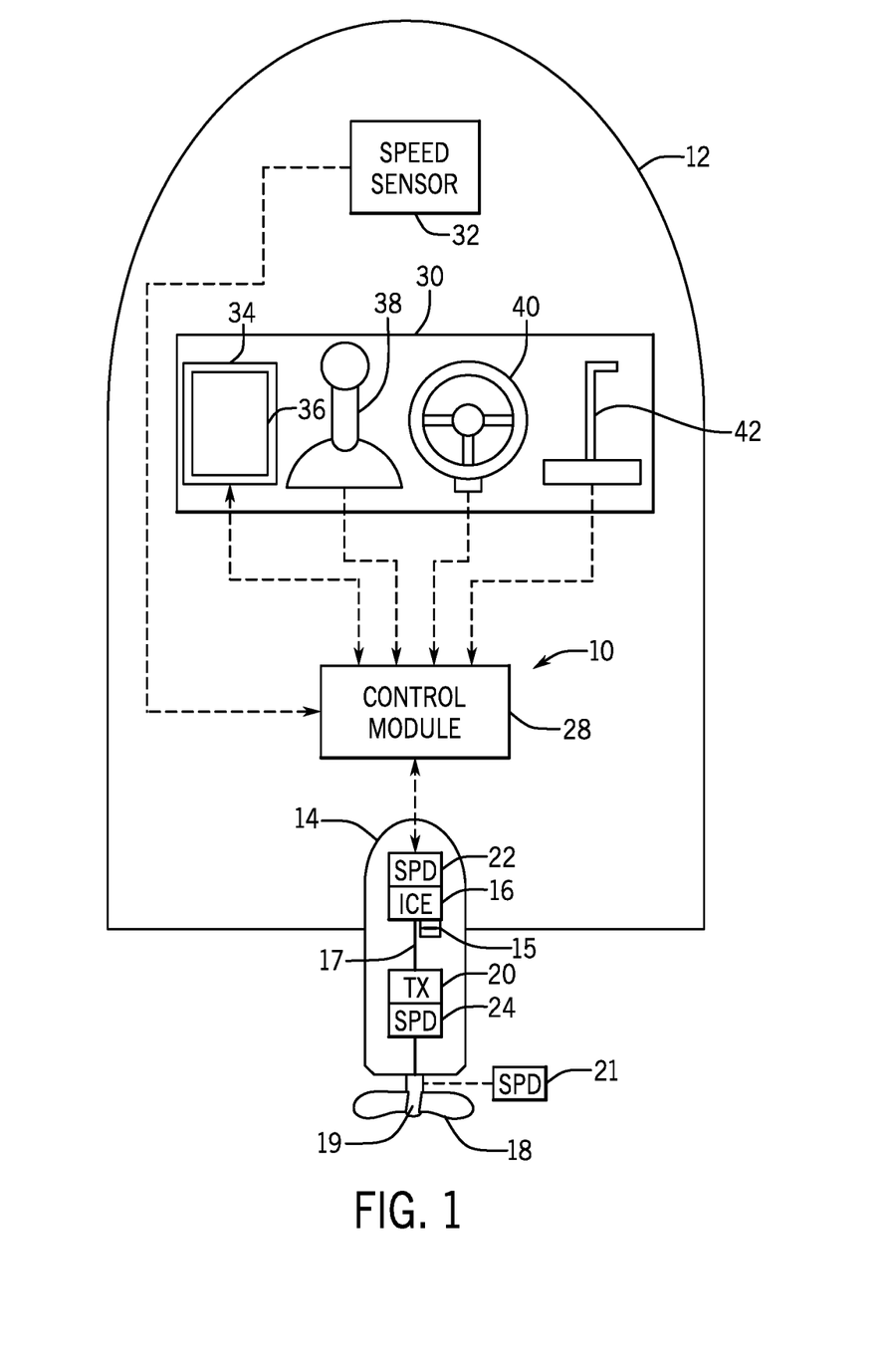
FIG. 1 illustrates a marine vessel with a marine propulsion system according to one example of the present disclosure.

FIG. 1 illustrates a marine propulsion system 10 for a marine vessel 12. The marine propulsion system 10 includes a marine propulsion device 14, but more than one marine propulsion device could instead be provided. The marine propulsion device 14 shown herein is an outboard motor, but the marine propulsion device could instead be an inboard motor, stern drive, pod drive, jet drive, etc. The marine propulsion device 14 includes an engine 16. The engine 16 shown here is an internal combustion engine, which may be, for example, a gasoline or diesel engine. The marine propulsion device 14 also includes a propeller 18 configured to be coupled in torque-transmitting relationship with the engine 16. Such torque-transmitting relationship is more specifically provided by way of a transmission 20 configured to transmit torque from the output shaft 17 of the engine 16 to the input shaft 19 of the propeller 18. As will described further hereinbelow, the transmission 20 may be configured to transmit forward driving torque from the engine 16 to the propeller 18 at a single gear ratio or at one of a first gear ratio and a second gear ratio, although additional gear ratios such as, for example, third, fourth, fifth, etc. gear ratios could be provided. The transmission 20 is also configured to transmit reverse driving torque from the engine 16 to the propeller 18.

The marine propulsion system 10 further includes an engine speed sensor 22 measuring a speed of the engine 16. In one example, the engine speed sensor 22 may be a shaft rotational speed sensor (e.g., tachometer), which measures a speed of the engine 16 in rotations per minute (RPM), as is known to those having ordinary skill in the art. The transmission 20 includes a transmission output speed (TOS) sensor 24 that measures an output speed of the transmission 20 in RPM. The TOS sensor 24 may be of a type similar to that of the engine speed sensor 22. Clutch pressure sensors (not shown) may also be provided in connection with the transmission 20. The clutch pressure sensors can be pressure transducers in a hydraulic circuit associated with the clutches of the transmission 20. Proportional valves (not shown here) are also provided, as will be described further hereinbelow.

The marine propulsion system 10 also includes a control module 28 in signal communication with the engine 16 and the transmission 20, as well as their associated sensors and valves and other components noted hereinbelow. The control module 28 is programmable and includes a processor and a memory. The control module 28 can be located anywhere in the marine propulsion system 10 and/or located remote from the marine propulsion system 10 and can communicate with various components of the marine vessel 12 via a peripheral interface and wired and/or wireless links, as will be explained further hereinbelow. Although FIG. 1 shows one control module 28, the marine propulsion system 10 can include more than one control module. Portions of the method disclosed herein below can be carried out by a single control module or by several separate control modules. For example, the marine propulsion system 10 can have control modules located at or near a helm 30 of the marine vessel 12 and can also have control module(s) located at or near the marine propulsion device 14. If more than one control module is provided, each can control operation of a specific device or sub-system on the marine vessel 12.

In some examples, the control module 28 may include a computing system that includes a processing system, storage system, software, and input/output (I/O) interfaces for communicating with peripheral devices. The systems may be implemented in hardware and/or software that carries out a programmed set of instructions. As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The control module 28 communicates with one or more components of the marine propulsion system 10 via the I/O interfaces and a communication link, which can be a wired or wireless link. In one example, the communication link is a controller area network (CAN) bus, but other types of links could be used. It should be noted that the extent of connections of the communication link shown herein is for schematic purposes only, and the communication link, in fact, provides communication between the control module 28 and each of the peripheral devices noted herein, although not every connection is shown in the drawing for purposes of clarity.

The marine propulsion system 10 also includes a vessel speed sensor 32 that measures a speed of the marine vessel 12, which vessel speed is conveyed to the control module 28. The vessel speed sensor 32 may be a global positioning system (GPS) receiver, a Pitot tube, a paddle wheel, or another known vessel speed sensor. Further, the marine propulsion system 10 includes a number of operator input devices located at the helm 30 of the marine vessel 12. The operator input devices include a multi-functional display device 34 including a user interface 36. The user interface 36 may be an interactive, touch-capable display screen, a keypad, a display screen and keypad combination, a trackball and display screen combination, or any other type of user interface known to those having ordinary skill in the art for communicating with a multi-functional display device 34. A joystick 38 is also provided at the helm 30 and allows an operator of the marine vessel 12 to command the marine vessel 12 to translate and/or rotate in multiple directions. A steering wheel 40 is provided for providing steering commands to the marine propulsion device 14 or to a rudder, in the event that the marine propulsion device is not steerable. A throttle lever 42 is also provided for providing thrust commands, including both a magnitude and a direction of thrust, to the control module 28.

Several of the operator input devices at the helm 30 can be used to input a requested gear state of the transmission 20 and a requested throttle position of a throttle valve 15 on the engine 16 to the control module 28, including the user interface 36 of the multi-functional display device 34, the joystick 38, and the throttle lever 42. By way of example, by placing the throttle lever 42 in a neutral detent position, the operator can request that neither a forward nor a reverse gear of the transmission 20 be engaged, and that the engine 16 operate at an idle speed. Pivoting of the throttle lever 42 in a forward direction away from the neutral detent position would be interpreted as a request to place the transmission 20 in the forward gear and, after the throttle lever 42 moved past a forward detent position, to operate the engine 16 above idle. The position of the throttle lever 42 could be interpreted as a value from 0% to 100% operator demand corresponding via an input/output map, such as a look-up table, to a position of the throttle valve 15 of the engine 16. For example, the input/output map might dictate that the throttle valve 15 is fully closed (i.e., at idle) when the throttle lever 42 is in the forward detent position (i.e., 0% demand) and is fully open when the throttle lever 42 is pushed forward to its furthest extent (i.e., 100% demand). Similarly, pivoting of the throttle lever 42 in a reverse direction away from the neutral detent position would be interpreted as a request to place the transmission 20 in the reverse gear and, after the throttle lever 42 moved past a reverse detent position, to operate the engine 16 above idle.

In another example, movement of the joystick 38 away from an upright detent position and/or rotation of the joystick 38 about the axis of the handle are interpreted as a request to place the engine 16 in gear and to produce forward and/or reverse thrust to accomplish a desired vessel maneuver indicated by movement of the joystick 38. Additionally, the user interface 36 can be used to request any number of operating modes of the marine propulsion system 10, in which modes the engine 16 and transmission 20 may be operated according to predetermined routines to carry out electronic anchoring, waypoint tracking, auto-heading, auto-pilot, auto-docking, or other automatic positioning modes. Furthermore, the user interface 36 and/or buttons on the base of the throttle lever 42 can, in some examples, be used to initiate a trolling mode of the marine propulsion system 10, in which the transmission 20 is operated to create slip between the engine 16 and the propeller 18 in order to provide a slower propeller speed than otherwise might be available. To initiate the trolling mode, the operator may pivot the throttle lever 42 into either the forward detent or reverse detent position, in order to place the transmission in forward or reverse gear and set the engine speed at idle. The operator may then press a plus or minus button or up or down arrow button provided on the user interface 36 or elsewhere at the helm 30 in order to vary the speed of the propeller 18.

Figure 2:
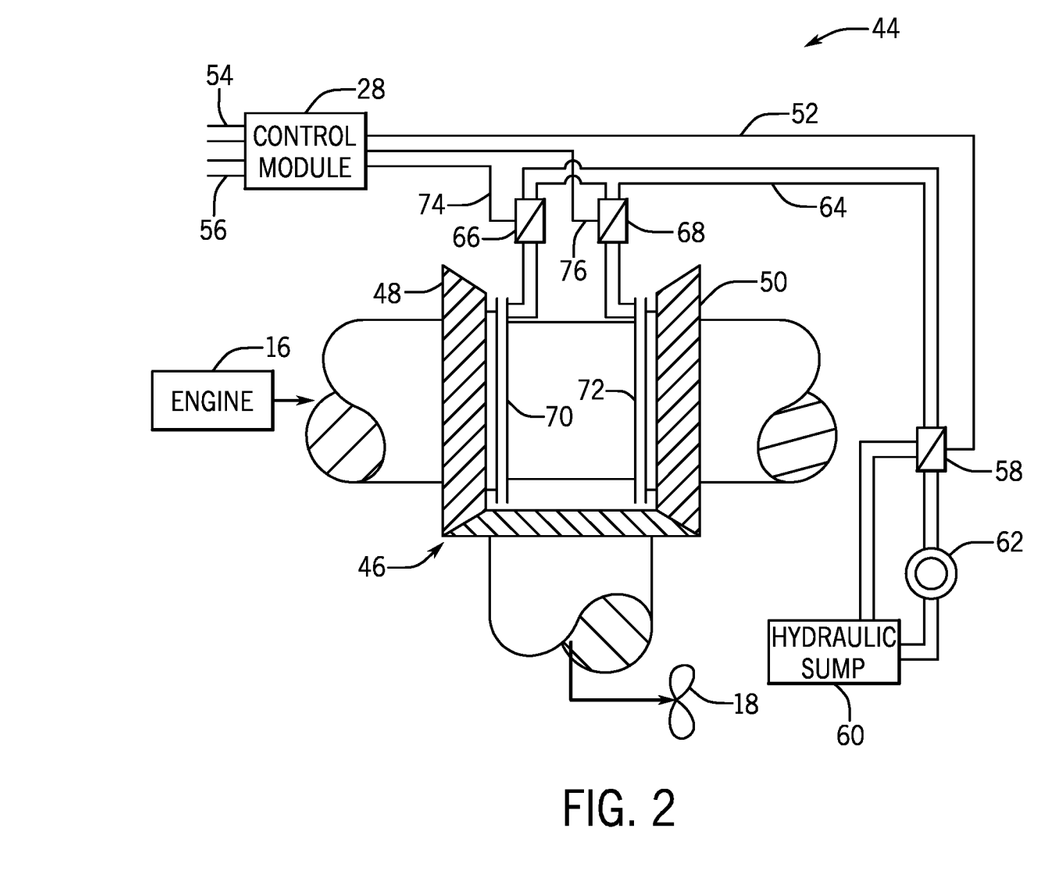
FIG. 2 illustrates one example of a transmission for a marine propulsion device of the marine propulsion system, wherein the transmission has a single forward gear and a single reverse gear.

FIG. 2 shows a shift controller 44 for the marine propulsion device 14, including the internal combustion engine 16 driving the propeller 18 through one example of a transmission 46 shiftable between forward and reverse gears, 48, 50 respectively. In one embodiment, the shift controller 44 uses a troll control signal 52 from control module 28, which communicates with the helm 30 and the engine 16 via respective CAN buses, 54, 56. The troll control signal 52 controls valve/solenoid 58 to supply hydraulic fluid from hydraulic sump 60 and hydraulic pump 62 at supply line 64 to apply limited hydraulic clutch pressure in forward and/or reverse through respective forward and reverse proportional valve/solenoids 66, 68 to respective forward and reverse clutches 70, 72 as controlled by respective forward and reverse control signals 74, 76 (electrical currents) from control module 28, as is known.

The forward and reverse clutches 70, 72 engage the forward and reverse gears 48, 50, respectively, via pressure plates of a wet clutch. One example of such a system is described in U.S. Pat. No. 8,439,800, which was incorporated by reference hereinabove. The amount of engagement of the clutches 70, 72 with the gears 48, 50 can optionally be controlled by the proportional valve/solenoids 66, 68, where engagement can range from not engaged (100% slip) to fully engaged (0% slip). Control over slip results in control over the resulting speed of the propeller 18 on the marine propulsion device 14, as more or less rotational power from the output shaft 17 of the engine 16 is transmitted to the forward or reverse gear 48, 50, which in turn provides more or less torque to the propeller input shaft 19. Therefore, a higher percentage of slip leads to lower propeller speeds (and thus lower boat speeds), and a lower percentage of slip leads to higher propeller speeds (and thus higher boat speeds).

Figure 3:
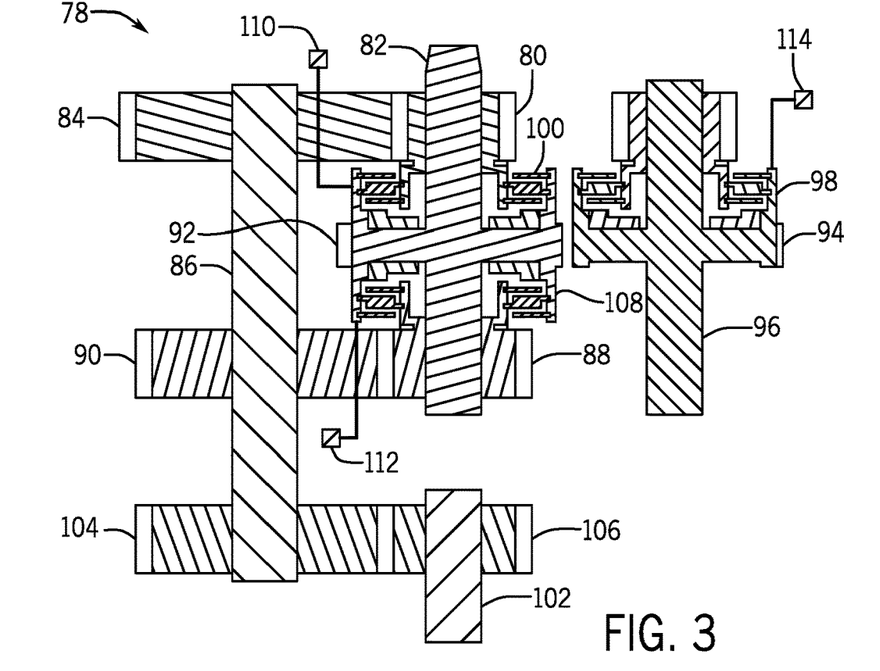
FIG. 3 illustrates another example of a transmission for the marine propulsion device, wherein the transmission has two forward gears and a reverse gear.

A schematic example of a multi-speed transmission 78 for the marine propulsion device 14 is shown in FIG. 3. The transmission 78 shown herein is a two-speed layshaft transmission, but other transmissions, such as epicyclic (planetary), dual-clutch, continuously variable, or of another known type could be used. The transmission 78 shown herein has two forward gear ratios, provided by a first input gear 80 on input shaft 82 (which is coupled to the output shaft 17 of the engine 16, as is known) and a first counter gear 84 on countershaft 86, and by a second input gear 88 and a second counter gear 90. Alternatively, fewer or more than two forward gear ratios could be provided. A reverse gear 92 is also provided on input shaft 82, and meshes with reverse gear 94 on reverse shaft 96. As is known, reverse rotation of the propeller 18 is accomplished by way of actuating a reverse clutch 98.

A first-gear clutch 100 is provided for placing the transmission 78 in first gear, such that first input gear 80 and first counter gear 84 transmit torque to an output shaft 102 via an output counter gear 104 and an output gear 106 at a first gear ratio. A second-gear clutch 108 is provided for placing the transmission 78 in second gear, such that second input gear 88 and second counter gear 90 transmit torque to output shaft 102 via output counter gear 104 and output gear 106 at a second gear ratio. In one example, the first gear ratio is higher than the second gear ratio. Thus, when the transmission 78 transmits torque from the engine output shaft 17 to the propeller input shaft 19 (via the transmission input shaft 82, the first gears 80, 84, the output gears 104, 106, and the output shaft 102), the transmission 78 provides more torque and less speed than it would provide were it to be placed in second gear, engine input speed and torque being equal.

Note that the clutches 98, 100, 108 shown herein are multi-plate wet disc clutches, and each may be provided with a proportional valve 110, 112, 114. The proportional valves 110, 112, 114 may be configured to receive control signals from the control module 28 and responsively control a pressure of hydraulic fluid to the clutches 100, 108, 98 in a manner similar to that described hereinabove with respect to FIG. 2, thus controlling the amount of engagement of the clutches 100, 108, 98 with their respective gears 80, 88, 94.

Figure 4:
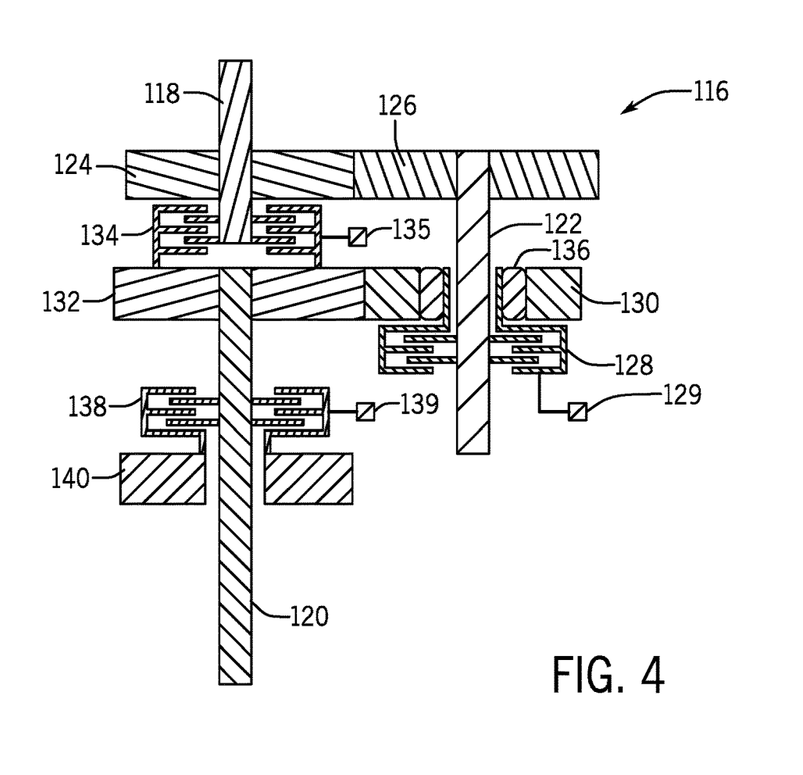
FIG. 4 illustrates yet another example of a transmission for the marine propulsion device, wherein the transmission has two forward gears, one of which is associated with a one-way clutch, and a reverse gear.

FIG. 4 illustrates yet another example of a transmission 116 for the marine propulsion device 14. The transmission 116 has an input shaft 118 and an output shaft 120. A countershaft 122 is provided in parallel with the input shaft 118 and the output shaft 120. Torque is transmitted from the input shaft 118 to a driving gear 124, which rotates a driven gear 126 on countershaft 122. A first forward gear state is accomplished by way of engaging first forward clutch 128, which causes a first driving gear 130 to rotate, in turn rotating a first driven gear 132 on the output shaft 120. In this gear state, a one-way clutch 136 provided on the countershaft 122 is in a holding state. A second forward gear state can be accomplished by way of engaging a second forward clutch 134 while engaging the first forward clutch 128. In this state, the one-way clutch 136 is in an overrunning state. In order to rotate the output shaft 120 and thus the propeller 18 in reverse, a reverse clutch 138 is provided with hydraulic pressure, thereby engaging reverse gear 140. In this state, the first and second forward clutches 128, 134 are both open. Each of the clutches 128, 134, 138 can be associated with a respective proportional valve 129, 135, 139 that controls their respective amounts of slip, as described hereinabove with respect to FIGS. 2 and 3.

It is well known that most wet clutch packs, even well-designed clutch packs, have a tendency to cause some drag torque even when the clutches are in the open or disengaged state. Such drag torque depends on many factors, such as lubricant viscosity (oil type and temperature), lubricant flow rate, clutch plate spacing/clearance, relative clutch plate speed, clutch plate inside and outside diameters, the number of clutch plates, the weight of the clutch plates, the type of friction material used, and the detailed geometry (e.g., groove pattern) of the clutch plates. During research and development, the present inventors discovered that for a marine transmission on a marine propulsion device, the drag torque acting through the clutch packs (if unbalanced) can result in a net torque being applied to the transmission output shaft. This net torque, if great enough, could result in undesired propeller rotation even when the transmission is in neutral. Additionally, the present inventors discovered that engagement of one or more clutches in the transmission can be used to slow a marine vessel 12 in the event of a throttle chop, such as if the propeller 18 and engine 16 can be used as a brake. In contrast, when the propeller 18 freewheels, the marine vessel 12 will not decelerate as quickly as if the propeller 18 were locked into rotation with the engine 16.

Referring to the transmission 116 shown in FIG. 4, some problems with prior art methods for controlling marine transmissions will be discussed. When the transmission control methods proposed hereinbelow are not used, there is a good probability of neutral propeller rotation. Because there are two clutches (the first forward clutch 128 and the second forward clutch 134) producing open pack drag tending to cause a drag torque on the output shaft 120 in the forward direction, while there is only one clutch (the reverse clutch 138) producing open pack drag tending to cause a drag torque on the output shaft 120 in the reverse direction, the result is that there is a likelihood of net torque on the output shaft 120 tending to cause shaft rotation in the forward direction. The extent of this net torque depends on many factors, including, but not limited to: bearing rolling torque, seal drag torque, clutch sizes (inner diameter, outer diameter, number of clutch plates), clutch plate relative velocities, lubricant flow rate distribution to each of the clutches, etc. Thus, the transmission 116 depends on factors such as bearing pre-load rolling torque, seal drag, etc. to prevent such neutral propeller rotation, which might not be adequate.

Additionally, because the transmission 116 includes the one-way clutch 136 on the first driving gear 130, if the transmission 116 is in first gear during a throttle chop event, the propeller 18 back drives through the gearcase and into the transmission 116 through the output shaft 120. The first driven gear 132 would then cause the one-way clutch 136 to overrun. The result would be similar to the propeller 18 pin-wheeling, and the vessel speed might not slow as rapidly as desired because there would be no ability for engine braking.

Note that although the above problems with prior art transmission control methods are described with respect to the transmission 116 of FIG. 4, similar drawbacks are present in the transmissions 46, 78 of FIGS. 2 and 3, respectively.

According to the transmission control methods discussed hereinbelow, the slip capabilities of the clutch packs in the transmissions 46, 78, 116 of FIGS. 2-4 are controlled by way of their associated proportional valves in order to actively control propeller rotation when the transmissions are in neutral and braking propeller speed during a throttle chop event.

For example, referring to the transmission 116 of FIG. 4, when the transmission 116 is in the neutral mode (i.e., first forward clutch 128, second forward clutch 134, and reverse clutch 138 are all open), if the two forward clutches 128, 134 create enough drag to cause the output shaft 120 to rotate, the reverse clutch 138 pressure is actively controlled to increase the drag of the reverse clutch 138 to provide a torque in the reverse direction, which balances the drag torque of the two forward clutches 128, 134. The transmission output speed (i.e., speed of output shaft 120) and/or the propeller speed (i.e., speed of the propeller input shaft 19) is monitored, and the pressure in the reverse clutch 138 is adjusted accordingly to maintain the shaft speed at or near zero rotations per minute (0 RPM). For example, the desired shaft speed may be +/−5-10 RPM. Such monitoring and adjustment could be by way of a feedback loop that accepts transmission output speed or propeller shaft speed as an input and outputs a desired change in reverse clutch pressure or a desired total reverse clutch pressure. Likewise, if the drag of the reverse clutch 138 overcomes the drag of the two forward clutches 128, 134, then a light application of pressure to the piston of either forward clutch 128, 134 is applied to provide a counter-torque to balance the drag torque on the output shaft 120 caused by the reverse clutch 138, again to maintain the speed of the transmission output shaft 120 or propeller input shaft 19 at or near 0 RPM+/−5-10 RPM. Note that even if the transmission 116 is in neutral, the propeller 18 might still be rotating from the effects of water flowing past the propeller 18, or there may be neutral drag torque causing rotation as noted hereinabove, and thus measuring the actual transmission output shaft 120 or propeller input shaft 19 speed serves as a basis for feedback to control the pressures in the clutches 124, 134, 138.

In another example, when the marine propulsion system 10 is operated in a trolling mode, the desired output speed of the transmission output shaft 120 or propeller input shaft 19 may be a non-zero value, and may be a trolling speed. The specific trolling speed may be calibrated, and in general is a speed that is slower than a speed that would be measured if there were no slip between the engine output shaft 17 and the propeller input shaft 19. In this example, the input to the feedback loop would again be the transmission output shaft speed or the propeller shaft speed, which would be compared to the desired trolling speed, and the pressure on the forward or reverse clutches would be adjusted in order to achieve the desired trolling speed of the transmission output shaft 120 or the propeller input shaft 19. Such control over the forward and/or reverse clutches minimizes the effects of uncertainty/noise due to "inactive" clutch drag torque while operating in trolling mode.

Note that the transmission output speed could be controlled to zero or the desired trolling speed, or the speed of the propeller input shaft 19 could be controlled to zero or the desired trolling speed, depending on how the control module 28 is programmed. It may be that the transmission output speed is dependent on drag torque on the gearcase, the gearcase ratio, and the propeller torque load (dependent on propeller diameter, propeller pitch, boat speed, and aeration) that is absorbed by the water.

For braking during a throttle chop event, the controlled clutch slip and engagement could be used to begin a controlled engagement of the reverse clutch 138 to cause the propeller 18 to produce a controlled braking thrust. It should be understood by those having ordinary skill in the art that during a throttle chop event, the requested throttle position of the throttle valve 15 on the engine 16 decreases by more than a predetermined amount within a predetermined period of time. In other words, during a throttle chop event, the throttle lever 42 is pulled back very quickly from a position representing a high demand (at or near 100% demand) to a position representing a low demand (at or near 0% demand). What constitutes a throttle chop and the predetermined amount by which and/or predetermined time within which the demand decreases may be calibrated and saved in the memory of the control module 28. Sometimes during a throttle chop event, an operator moves the throttle lever 42 all the way to reverse, but other times the operator moves the throttle lever 42 only to forward detent or neutral detent. Therefore, in the present methods, care is taken not to begin moving the marine vessel 12 backwards when reverse is not requested at the controls by the operator. Nonetheless, if the marine vessel 12 is still moving forward after the propeller speed reaches zero or near zero, it may be desirable to open the forward clutch (128 or 134) and engage only the reverse clutch 138 to provide further braking beyond what would otherwise be available. So long as the marine vessel 12 continues moving in a forward direction, the operator would likely not even notice that the propeller 18 is rotating in reverse.

Because the clutch plates in the reverse clutch 138 are rotating in opposite directions when the reverse clutch 138 is used for braking during a throttle chop event, resulting in a high relative speed between the plates, it is likely that heat is generated rapidly. Therefore, adequate cooling needs to be provided. Either the control strategy and/or component design of the reverse clutch 138 may be adapted to avoid overheating the reverse clutch 138 or overloading the reverse clutch 138 and associated gear components. For example, the reverse clutch 138 might be pressurized and depressurized repeatedly to avoid overheating.

Again, although the present transmission control method for braking during a throttle chop event is described with respect to the transmission 116 of FIG. 4, similar strategies could be used with the transmission 46 of FIG. 2 or the transmission 78 of FIG. 3.

Figure 5:
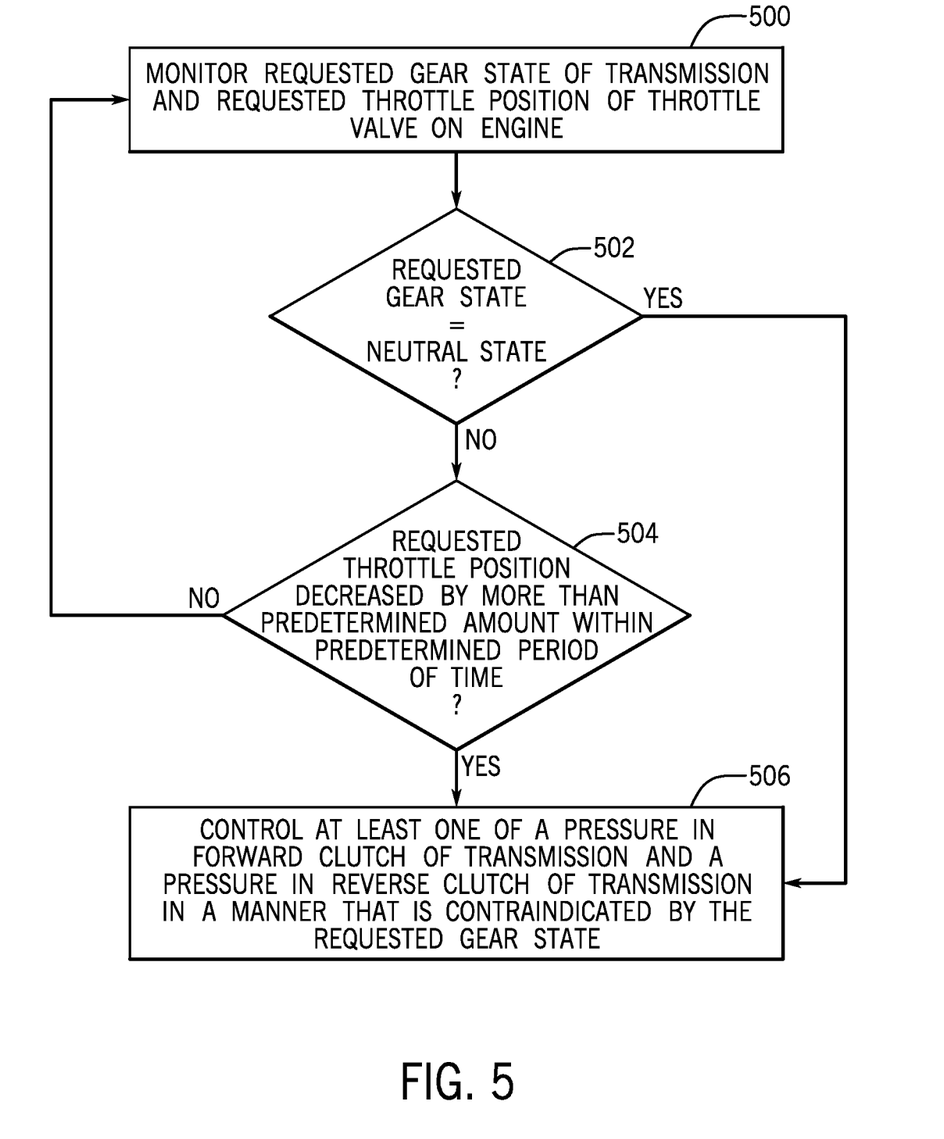
FIG. 5 illustrates a method for controlling a transmission of a marine propulsion device powered by an engine according to the present disclosure.

Now referring to FIG. 5, a method for controlling a transmission 20, 46, 78, 116 of a marine propulsion device 14 powered by an engine 16 will be described. The method is carried out by a control module 28 and includes, as shown at 500, monitoring a requested gear state of the transmission 20, 46, 78, 116 and a requested throttle position of a throttle valve 15 on the engine 16. The requested gear state and the requested throttle position may be input via a control lever (e.g., throttle lever 42) in signal communication with the control module 28. Alternatively, the requested gear state and requested throttle position may be according to a position of the joystick 38 or according to commands from an automatic operating mode of the marine propulsion system 10. In response to the requested gear state being a neutral state or in response to the requested throttle position decreasing by more than a predetermined amount within a predetermined period of time, the method includes controlling at least one of a pressure in a forward clutch 70, 100, 108, 128, 134 of the transmission 20, 46, 78, 116 and a pressure in a reverse clutch 72, 98, 138 of the transmission 20, 46, 78, 116 in a manner that is contraindicated by the requested gear state.

More specifically, as shown at 502, the control module 28 determines if the requested gear state is a neutral state. The neutral state may be requested by the throttle lever 42 being placed in the above-described neutral detent position, the joystick 38 being in its upright, non-tilted, non-rotated position, or an automatic operating mode of the marine propulsion system 10 commanding the transmission 20 to the neutral state. If no at 502, the control module 28 next makes a determination, as shown at 504, regarding whether the requested throttle position has decreased by more than a predetermined amount within a predetermined period of time. In other words, the control module 28 determines if a throttle chop event has occurred. While a throttle chop event is most likely to occur when the operator moves the throttle lever 42 from a position representing a high demand to a position representing a low demand, in some cases, one of the automatic operating modes described hereinabove may also initiate a throttle chop, such as if an obstacle is sensed in the path of the marine vessel 12. If no at 504, the method returns to 500, and the control module 28 continues to monitor the requested gear state of the transmission 20, 46, 78, 116 and the requested throttle position of the throttle valve 15 on the engine 16.

If yes at 502 and/or yes at 504, the method continues to 506, where the control module 28 controls at least one of a pressure in a forward clutch 70, 100, 108, 128, 134 of the transmission 20, 46, 78, 116 and a pressure in a reverse clutch 72, 98, 138 of the transmission 20, 46, 78, 116 in a manner that is contraindicated by the requested gear state. In other words, the control module 28 may provide a positive pressure in one or both of the forward clutch 70, 100, 108, 128, 134 and the reverse clutch 72, 98, 138 even when the neutral state is requested, in order to prevent neutral propeller rotation. Similarly, the control module 28 may provide a positive pressure in the reverse clutch 72, 98, 138 even when the reverse gear state is not requested, in order to provide braking during a throttle chop event.

As noted hereinabove, the transmission of the marine propulsion device 14 may include both first and second forward gears, and thus the method may include controlling a pressure in an additional forward clutch of the transmission 78, 116 in the manner that is contraindicated by the requested gear state in response to the requested gear state being the neutral state (yes at 502) or in response to the requested throttle position decreasing by more than the predetermined amount within the predetermined period of time (yes at 504).

The method disclosed herein may further comprise monitoring a rotational speed of the propeller 18 of the marine propulsion device 14. In response to the requested gear state being the neutral state (yes at 502) the method may include controlling the at least one of the forward clutch pressure and the reverse clutch pressure to balance the net torque on the output shaft 102, 120 so as to maintain a desired rotational speed of the propeller 18. As noted hereinabove, the desired rotational speed of the propeller 18 may be about 0 RPM+/−5-10 RPM.

In another example, the method includes controlling the reverse clutch pressure to a positive reverse clutch pressure value in a manner that is contraindicated by a position of the throttle lever 42. In such an example, the desired rotational speed of the propeller 18 may be a desired trolling speed. As noted hereinabove, in the trolling mode, the operator will have shifted the throttle lever 42 into either forward detent or reverse detent, thus placing the transmission in forward or reverse gear, and then used buttons to control the trolling speed of the propeller 18. According to the present strategy, the control module 28 will thereafter control the pressure in the forward and reverse clutches, regardless of whether the forward detent or reverse detent position was selected via the throttle lever 42, in order to maintain the propeller speed at the desired trolling speed input by the operator.

Figure 8:
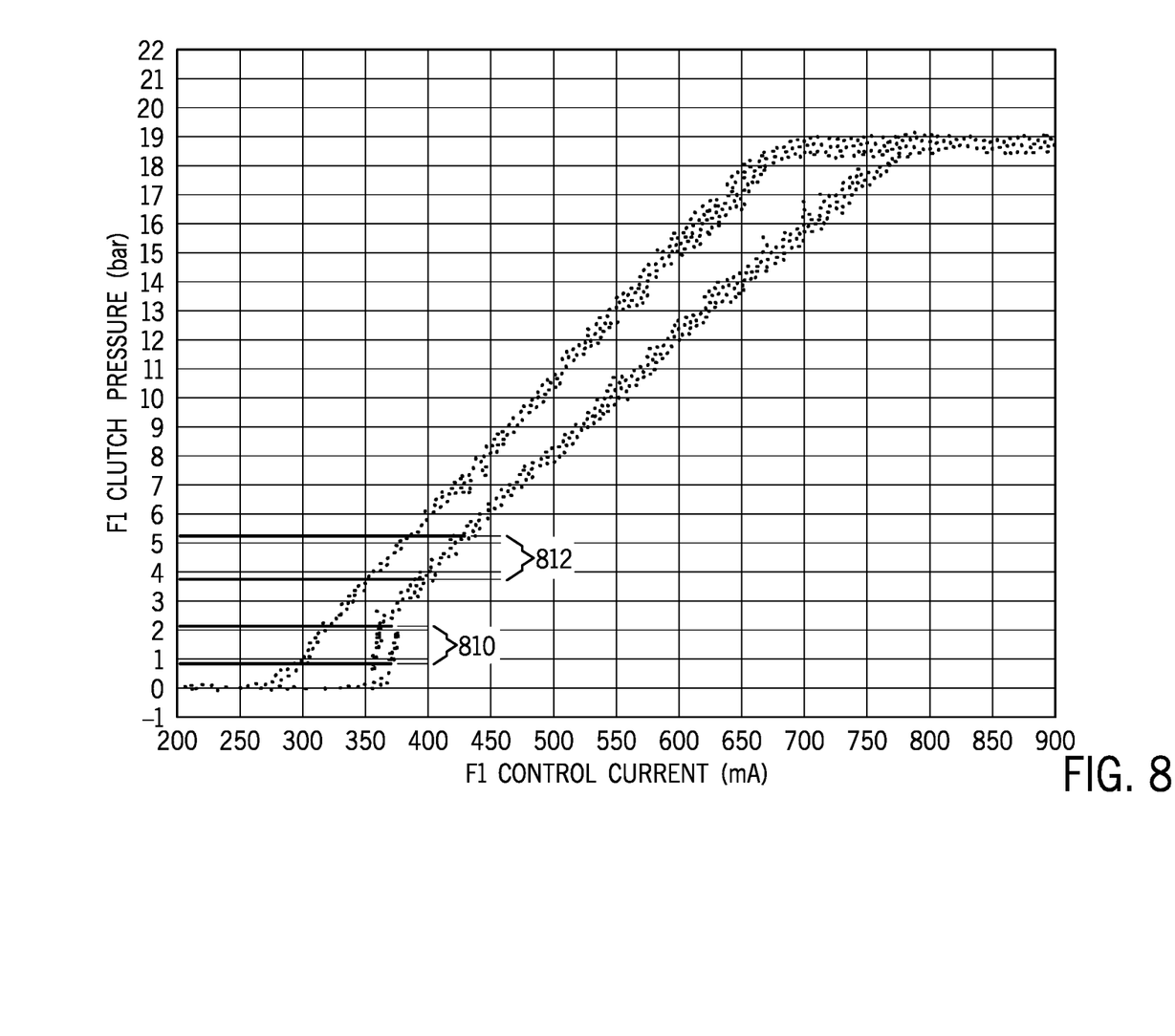
FIG. 8 is a graph showing forward clutch pressure and reverse clutch pressure versus control signal current for an exemplary transmission in response to a request for forward trolling according to one implementation of the present disclosure.

Because two variables are controlled instead of only one, much more precise control can be achieved over the propeller speed for trolling, for throttle chop braking, and for neutral braking. Any combination of Forward clutch torque and Reverse clutch torque can be utilized to achieve the net torque balance that yields the desired propeller speed. FIG. 8 is a graph showing forward clutch pressure and reverse clutch pressure versus control signal current for an exemplary transmission 20, 46, 78, 116 in response to a request for forward trolling, where 19 bar is the maximum clutch pressure of the fully engaged clutch during normal operation when slip is not wanted. The clutch pressure employed in prior art transmission control methods for forward trolling is typically 1-2 bar. As illustrated in the graph, the relationship between the control signal current and clutch pressure in this region 810 between 1 bar and 2 bar is not very predictable. Therefore, the clutch torque, and consequently the propeller speed, is not very easy to control.

As disclosed herein, pressure may be applied to the reverse clutch to improve the precision of control of the forward propeller speed during trolling mode. By controlling both the forward and the reverse clutch pressures simultaneously, the effective forward troll pressure range is moved into a more stable and linear control region. The request for forward trolling may be from the operator (e.g. via the joystick 38) or by the control module 28 (e.g., operating trolling mode or station keeping mode). When pressure is applied to the reverse clutch, a small drag torque is created in the reverse direction. This increases the torque required from the forward clutch to balance net torque at the desired propeller speed. This has the effect of pushing the trolling pressure region higher for the forward clutch—region 812—to a more linear portion of the pressure-current relationship.

The method may further include monitoring a speed of the engine 16 and a speed of the marine vessel 12 powered by the marine propulsion device 14. In response to the requested throttle position decreasing by more than the predetermined amount within the predetermined period of time (yes at 504), the method may include controlling the at least one of the forward clutch pressure and the reverse clutch pressure based on the engine speed and the vessel speed. As noted in hereinabove, engine speed can be measured by engine speed sensor 22 and vessel speed can be measured by vessel speed sensor 32. Calibrated curves and/or lookup tables can be used to output a pressure to be applied to the forward and reverse clutches based on the inputs of the engine speed and vessel speed. Such calibrated curves or lookup tables may be determined by experimentation. Alternatively, a machine learning algorithm may be implemented such that the calibration automatically adjusts for each vessel.

Although the forward clutch pressure and the reverse clutch pressure can be controlled based on the engine speed and the vessel speed, it may also be desirable to monitor the output speed of the transmission 20, 46, 78, 116 and, in response to the requested throttle position decreasing by more than the predetermined amount within the predetermined period of time, to control the at least one of the forward clutch pressure and the reverse clutch pressure based on the engine speed, the vessel speed, and the transmission output speed. As noted hereinabove, the transmission output speed can be monitored by TOS sensor 24. Calibrated curves and/or lookup tables can be used to output a pressure to be applied to the forward and reverse clutches based on the inputs of the engine speed, vessel speed, and transmission output speed. Such calibrated curves or lookup tables may be determined by experimentation or machine learning.

Figure 6:
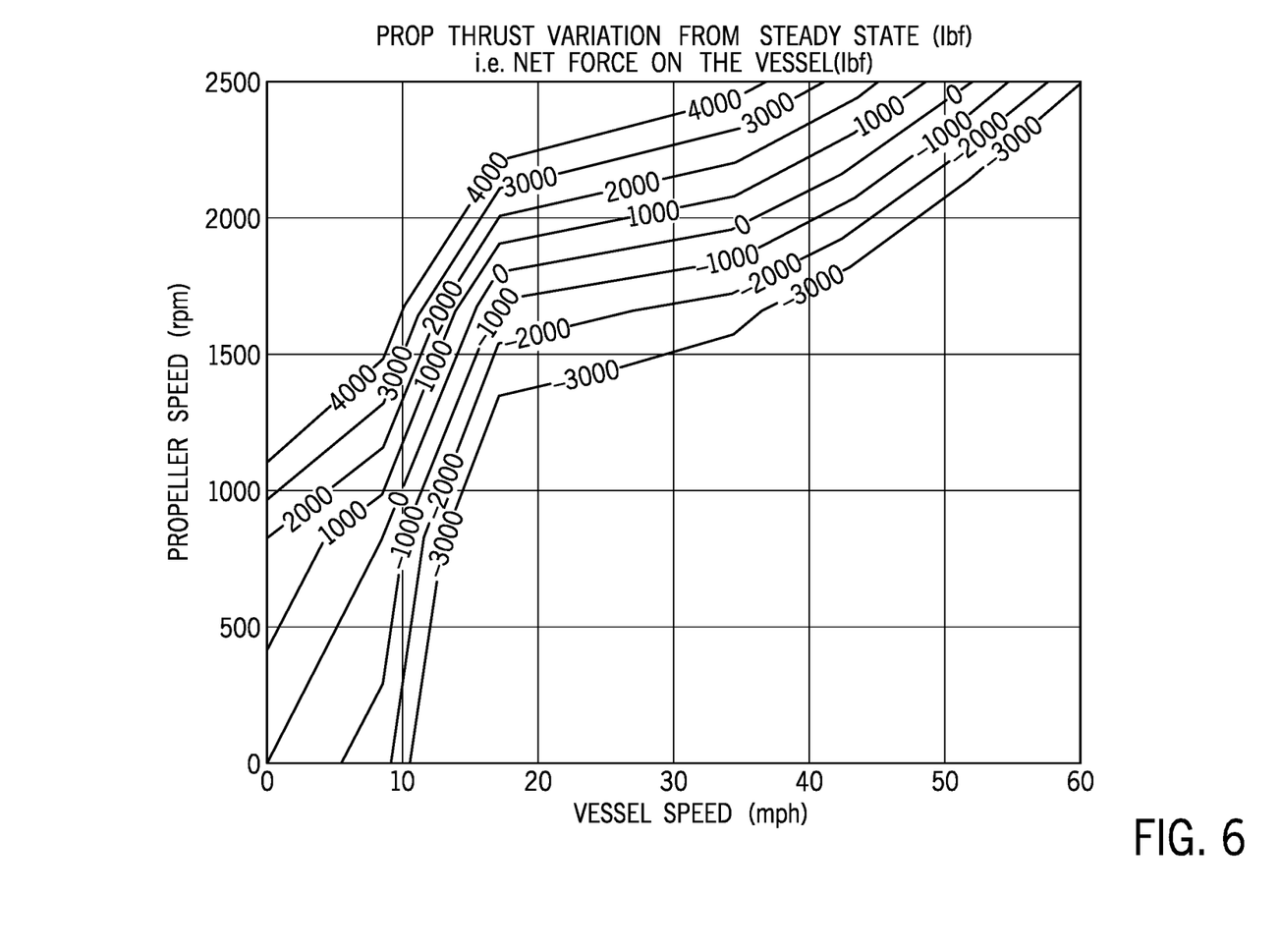
FIG. 6 illustrates an exemplary relationship between boat speed, propeller speed, and propeller thrust variation from steady state operation.

In still another example, in response to the requested throttle position decreasing by more than the predetermined amount within the predetermined period of time, the method includes controlling the forward clutch pressure and the reverse clutch pressure such that the propeller 18 of the marine propulsion device 14 produces a controlled braking thrust. For example, it may be desirable to control the forward clutch pressure to a first positive value and control the reverse clutch pressure to a second positive value initially in response to a throttle chop event, and later to control the forward clutch pressure to about zero units and control the reverse clutch pressure to a positive value, in order to maintain a constant, controlled braking thrust (net force) on the marine vessel 12 until it stops. FIG. 6 shows a map of net thrust force acting on a marine vessel 12 (contours shown in lbf) as a function of propeller speed (RPM) and vessel speed (mph). The "zero" contour line is steady state operation, at which the marine vessel 12 is neither accelerating nor decelerating (i.e., maintaining constant speed). It can be seen that at a given vessel speed, a decrease in propeller speed will result in a decrease in net force on the vessel. Below the steady state contour, when the net force is negative, a braking force is provided on the marine vessel 12. So, for example, to maintain 1000 lbf of braking force (−1000 lbf thrust), the propeller speed must be continuously reduced and held below the steady state (equilibrium) contour as the marine vessel 12 decelerates. It should be understood that the data shown in FIG. 6 is for a particular marine vessel and a particular propeller set, and will vary for different setups.

Figure 7:
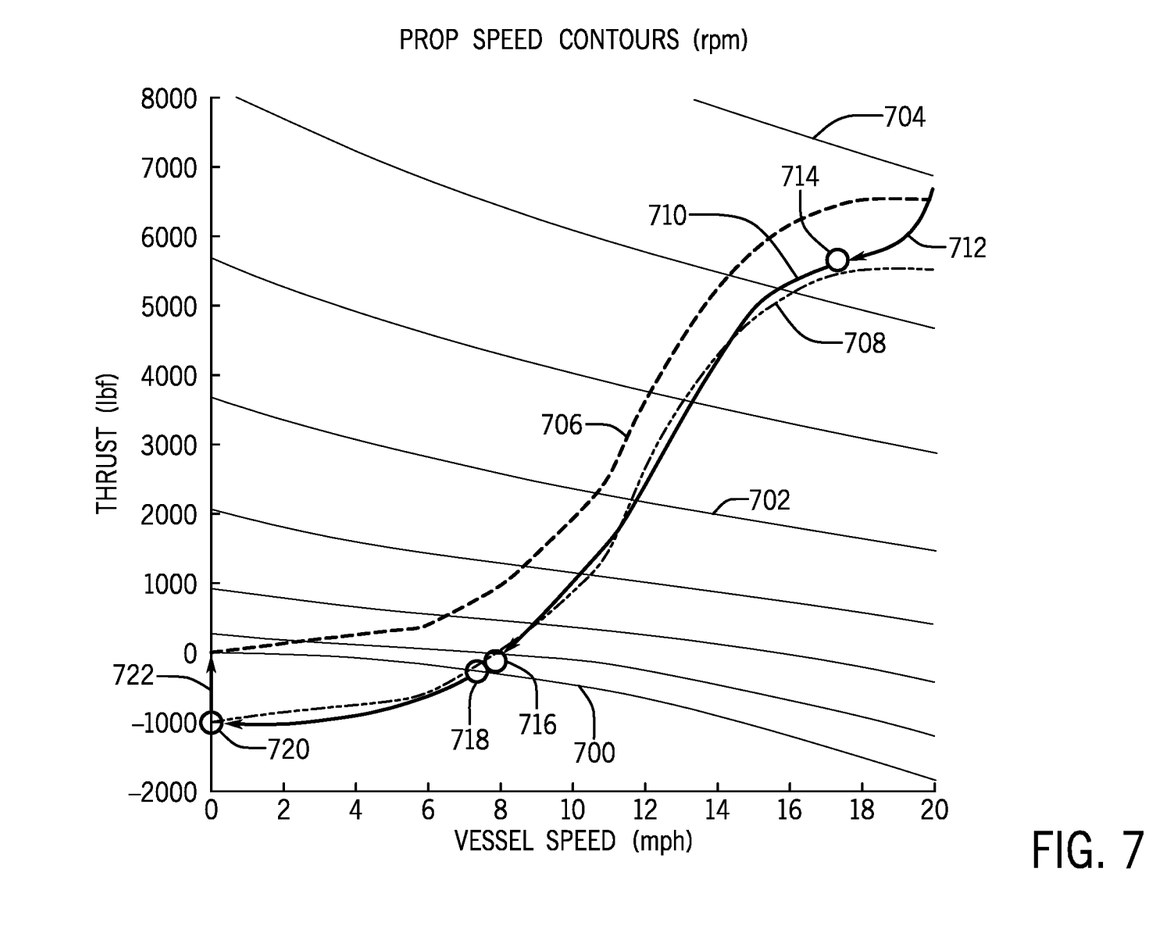
FIG. 7 illustrates the net thrust acting on a marine vessel according to a method of the present disclosure for controlling a transmission of a marine propulsion device.

FIG. 7 shows an example in which 1000 lbf of braking force is maintained on a marine vessel 12 in response to a throttle chop event. The somewhat horizontal contours are propeller speeds, where contour 700 represents a propeller speed of 0 RPM, contour 702 represents a propeller speed of 1111 RPM, and contour 704 represents a propeller speed of 1944 RPM. (The propeller speeds for the remainder of the contours can be determined by interpolation.) Curve 706 represents the boat load curve at steady state. Curve 708 represents the desired 1000 lbf of braking force. Curve 710 represents the actual braking force applied using the method of the present disclosure. Arrow 712 represents a throttle chop event, as is shown by the rapid decrease in thrust. At point 714, the transmission 20 is controlled such that the reverse clutch pressure is increased to a positive value. From point 714 to point 716, the engine speed decreases according to the decrease in operator demand, while the proportional valves are used to actively control pressure in the forward and reverse clutches to control propeller speed and torque and thus the net force on the marine vessel 12. At point 718, the transmission 20 is operated such that the pressure in the forward clutch is reduced to about zero and the pressure in the reverse clutch is a positive value. This allows for further braking beyond what propeller pin-wheeling or engine motoring torque would otherwise provide. At point 720, the marine vessel 12 stops. The transmission 20 is returned to neutral once the marine vessel 12 stops, as shown by arrow 722.

Thus, the method includes controlling the forward clutch pressure to a first positive value and controlling the reverse clutch pressure to a second positive value initially in response to the requested throttle position decreasing by more than the predetermined amount within the predetermined period of time. See curve 710 from point 714 to point 716. The method includes subsequently controlling the forward clutch pressure to about zero units and controlling the reverse clutch pressure to a positive value in response to the vessel speed being positive when the propeller speed is about zero (e.g., less than 10 RPM). See curve 710 from point 718 to point 720. In other words, as described hereinabove, it may be desirable to disengage the forward clutch 70, 100, 108, 128, 134 and provide braking solely with the reverse clutch 72, 98, 138 engaged when the vessel 12 is still moving forward after the propeller 18 has stopped or nearly stopped. Note that the forward clutch pressure being controlled to zero units does not necessarily mean that the absolute pressure in the forward clutch 70, 100, 108, 128, 134 is zero, but rather indicates that no additional pressure above atmospheric is provided to the forward clutch 70, 100, 108, 128, 134. Thus, the present method allows for controlling propeller speed independently of engine speed to thereby control the marine vessel's deceleration. Disengaging the reverse clutch once the vessel speed reaches zero (see point 720) prevents the marine vessel 12 from unexpectedly moving backwards.

Referring back to FIG. 1, the present disclosure thus describes a marine propulsion system 10 for a marine vessel 12, the marine propulsion system 10 including an engine 16 having an output shaft 17 and a propeller 18 having an input shaft 19. A transmission 20 is configured to couple the engine's output shaft 17 to the propeller's input shaft 19 in a torque-transmitting relationship. The transmission 20 includes a forward gear (e.g., 48, 80, 130) and an associated forward clutch (e.g., 70, 100, 128) and a reverse gear (e.g., 50, 94, 140) and an associated reverse clutch (e.g., 72, 98, 138). The marine propulsion system 10 further includes a control lever (e.g., throttle lever 42) positionable to request engagement of one of the forward gear and the reverse gear of the transmission 20. A control module 28 controls a pressure in the forward clutch and a pressure in the reverse clutch, as described hereinabove, such as by way of one or more proportional valves. The control module 28 controls the reverse clutch pressure to a positive reverse clutch pressure value in a manner that is contraindicated by a position of the control lever. For example, even if the throttle lever 42 is in a neutral position, the control module 28 may control the reverse clutch pressure to the positive reverse clutch pressure value in order to counteract a drag torque acting in a forward rotational direction on the propeller input shaft 19. Furthermore, even if the throttle lever 42 is in a forward detent or neutral detent position, the control module 28 may control the reverse clutch pressure to the positive reverse clutch pressure value in order to provide a braking force to the propeller input shaft 19 in the event of a throttle chop.

According to the present disclosure, the control lever is also positionable to request a throttle position of a throttle valve 15 on the engine 16. The control module 28 controls the reverse clutch pressure to the positive reverse clutch pressure value in the manner that is contraindicated by the position of the control lever in response to the throttle position decreasing by more than a predetermined amount within a predetermined period of time (see 504, FIG. 5).

The marine propulsion system 10 may further include an engine speed sensor 22 measuring a speed of the engine 16 and a vessel speed sensor 32 measuring a speed of the marine vessel 12. The control module 28 may determine the positive reverse clutch pressure value based on the engine speed and the vessel speed. The marine propulsion system 10 may further include a transmission output speed sensor 24 measuring an output speed of the transmission 20. The control module 28 may determine the positive reverse clutch pressure value based on the engine speed, the vessel speed, and the transmission output speed.

In one example, in response to the requested throttle position decreasing by more than the predetermined amount within the predetermined period of time, the control module 28 controls the forward clutch pressure and the reverse clutch pressure such that the propeller 18 produces a controlled braking thrust. In response to the requested throttle position decreasing by more than the predetermined amount within the predetermined period of time, the control module 28 may initially control the forward clutch pressure to a positive forward clutch pressure value and control the reverse clutch pressure to the positive reverse clutch pressure value. The marine propulsion system 10 may further include a vessel speed sensor 32 measuring a speed of the marine vessel 12 and a sensor providing information related to a rotational speed of the propeller's input shaft 19. The latter sensor may be a propeller speed sensor 21. Alternatively, the propeller shaft's speed could be calculated using information from the TOS sensor 24 by accounting for the gear ratio between the transmission output and the propeller input. The control module 28 subsequently controls the forward clutch pressure to about zero units and controls the reverse clutch pressure to the positive reverse clutch pressure value in response to the vessel speed being positive when the propeller's input shaft speed is about zero.

The marine propulsion system 10 may further include a propeller speed sensor 21 measuring a rotational speed of the propeller's input shaft 19. In response to the position of the control lever indicating that the transmission 20 is to be operated in neutral, the control module 28 controls the reverse clutch pressure to the positive reverse clutch pressure value in the manner that is contraindicated by the position of the control lever so as to maintain a desired rotational speed of the propeller's input shaft 19. As noted hereinabove, the desired rotational speed of the propeller's input shaft 19 may be about 0 RPM. In another example, when the control lever is in the forward detent or reverse detent position, the desired rotational speed of the propeller's input shaft may be a trolling speed.

Because two variables are controlled (forward clutch torque/pressure and reverse clutch torque/pressure) instead of only one, much more precise control can be achieved over the propeller speed for trolling, for throttle chop braking, and for neutral braking. Any combination of Forward clutch torque and Reverse clutch torque can be utilized to achieve the net torque balance that yields the desired propeller speed. FIG. 8 is a graph showing forward clutch pressure and reverse clutch pressure versus control signal current for an exemplary transmission where 19 bar is the maximum clutch pressure of the fully engaged clutch during normal operation when slip is not wanted. The clutch pressure employed in prior art transmission control methods in response to a request for forward trolling is typically 1-2 bar, depicted as region 810. The request for forward trolling may be from the operator (e.g. via the joystick 38) or by the control module 28 (e.g., operating trolling mode or station keeping mode). As illustrated in the graph, the relationship between the control signal current and clutch pressure in this region 810 between 1 bar and 2 bar is not very predictable. Therefore, precise control over the clutch torque, and consequently the propeller speed, is challenging.

As disclosed herein, pressure may be applied to the reverse clutch to improve the precision of control of the forward propeller speed during trolling mode. By controlling both the forward and the reverse clutch pressures simultaneously, the effective forward troll pressure range is moved into a more stable and linear control region. When pressure is applied to the reverse clutch, a small drag torque is created in the reverse direction. This increases the torque required from the forward clutch to balance net torque at the desired propeller speed. This has the effect of pushing the trolling pressure region higher for the forward clutch—region 812—to a more linear portion of the pressure-current relationship.

The marine propulsion system 10 may further include a second forward gear an associated second forward clutch. The control module 28 may control the second forward clutch pressure to a positive value while controlling the reverse clutch pressure to the positive reverse clutch pressure value. In other words, if a throttle chop event occurs while the transmission 20 is operating in second gear, braking by way of the reverse clutch (e.g., 98 or 138) can still be provided. In further embodiments, the transmission 20 may further comprise a one-way clutch (e.g., 136) associated with the first forward gear 130 and the first forward clutch 128.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for controlling a transmission of a marine propulsion device powered by an engine, the method being carried out by a control module and comprising:
    monitoring a requested gear state of the transmission and a requested throttle position of a throttle valve on the engine;
    in response to the requested gear state being a neutral state or in response to the requested throttle position decreasing by more than a predetermined amount within a predetermined period of time, controlling at least one of a pressure in a forward clutch of the transmission and a pressure in a reverse clutch of the transmission in a manner that is contraindicated by the requested gear state.

2. The method of claim 1, further comprising monitoring a rotational speed of a propeller of the marine propulsion device; and
    in response to the requested gear state being the neutral state, controlling the at least one of the forward clutch pressure and the reverse clutch pressure so as to maintain a desired rotational speed of the propeller.

3. The method of claim 2, wherein the desired rotational speed of the propeller is about zero rotations per minute.

4. The method of claim 1, further comprising:
    monitoring a speed of the engine;
    monitoring a speed of a vessel powered by the marine propulsion device; and
    in response to the requested throttle position decreasing by more than the predetermined amount within the predetermined period of time, controlling the at least one of the forward clutch pressure and the reverse clutch pressure based on the engine speed and the vessel speed.

5. The method of claim 4, further comprising:
    monitoring an output speed of the transmission; and
    in response to the requested throttle position decreasing by more than the predetermined amount within the predetermined period of time, controlling the at least one of the forward clutch pressure the reverse clutch pressure based on the engine speed, the vessel speed, and the transmission output speed.

6. The method of claim 1, further comprising, in response to the requested throttle position decreasing by more than the predetermined amount within the predetermined period of time, controlling the forward clutch pressure and the reverse clutch pressure such that a propeller of the marine propulsion device produces a controlled braking thrust.

7. The method of claim 6, further comprising controlling the forward clutch pressure to a first positive value and controlling the reverse clutch pressure to a second positive value initially in response to the requested throttle position decreasing by more than the predetermined amount within the predetermined period of time.

8. The method of claim 7, further comprising:
    monitoring a speed of a vessel powered by the marine propulsion device;
    monitoring a speed of the propeller; and
    subsequently controlling the forward clutch pressure to about zero units and controlling the reverse clutch pressure to a positive value in response to the vessel speed being positive when the propeller speed is about zero.

9. The method of claim 1, further comprising controlling a pressure in an additional forward clutch of the transmission in the manner that is contraindicated by the requested gear state in response to the requested gear state being the neutral state or in response to the requested throttle position decreasing by more than the predetermined amount within the predetermined period of time.

10. The method of claim 1, wherein the requested gear state and the requested throttle position are input via a control lever in signal communication with the control module.

11. A marine propulsion system for a marine vessel, the marine propulsion system comprising:
    an engine having an output shaft;
    a propeller having an input shaft;
    a transmission configured to couple the engine's output shaft to the propeller's input shaft in a torque-transmitting relationship, the transmission including a forward clutch configured to operate the transmission in a forward gear state and a reverse clutch configured to operate the transmission in a reverse gear state;

a positionable control lever configured to request one of the forward gear state and the reverse gear state of the transmission; and a control module configured to control a pressure in the forward clutch and a pressure in the reverse clutch;

wherein the control module is configured to control the reverse clutch pressure to a positive reverse clutch pressure value in a manner that is contraindicated by a position of the control lever.

12. The marine propulsion system of claim 11, wherein the control lever is also configured to request a throttle position of a throttle valve on the engine; and wherein the control module is configured to control the reverse clutch pressure to the positive reverse clutch pressure value in the manner that is contraindicated by the position of the control lever in response to the requested throttle position decreasing by more than a predetermined amount within a predetermined period of time.

13. The marine propulsion system of claim 12, further comprising:

an engine speed sensor configured to measure a speed of the engine; and a vessel speed sensor configured to measure a speed of the marine vessel;

wherein the control module is configured to determine the positive reverse clutch pressure value based on the engine speed and the vessel speed.

14. The marine propulsion system of claim 13, further comprising a transmission output speed sensor configured to measure an output speed of the transmission;

wherein the control module is configured to determine the positive reverse clutch pressure value based on the engine speed, the vessel speed, and the transmission output speed.

15. The marine propulsion system of claim 12, wherein, in response to the requested throttle position decreasing by more than the predetermined amount within the predetermined period of time, the control module is configured to control the forward clutch pressure and the reverse clutch pressure such that the propeller produces a controlled braking thrust.

16. The marine propulsion system of claim 15, wherein, in response to the requested throttle position decreasing by more than the predetermined amount within the predetermined period of time, the control module is configured to initially control the forward clutch pressure to a positive forward clutch pressure value and is configured to initially control the reverse clutch pressure to the positive reverse clutch pressure value.

17. The marine propulsion system of claim 16, further comprising:

a vessel speed sensor configured to measure a speed of the marine vessel; and a sensor configured to provide information related to a rotational speed of the input shaft of the propeller;

wherein the control module is configured to subsequently control the forward clutch pressure to about zero units and is configured to subsequently control the reverse clutch pressure to the positive reverse clutch pressure value in response to the vessel speed being positive when the speed of the input shaft of the propeller is about zero.

18. The marine propulsion system of claim 11, further comprising a propeller speed sensor configured to measure a rotational speed of the input shaft of the propeller;

wherein in response to a position of the control lever indicating that the transmission is to be operated in neutral, the control module is configured to control the reverse clutch pressure to the positive reverse clutch pressure value in the manner that is contraindicated by the position of the control lever so as to maintain a desired rotational speed of the input shaft of the propeller.

19. The marine propulsion system of claim 18, wherein the desired rotational speed of the input shaft of the propeller is about zero rotations per minute.

20. The marine propulsion system of claim 11, wherein the transmission further comprises a one-way clutch provided on a shaft with the forward clutch.

* * * * *